US012753017B1

(12) United States Patent
Joshi et al.

(10) Patent No.: US 12,753,017 B1
(45) Date of Patent: Oct. 6, 2026

(54) SYSTEM AND METHOD FOR SINGULATION IN A CONVEYOR SYSTEM

(71) Applicant: Amazon Technologies, Inc., Seattle, WA (US)

(72) Inventors: Sumant Girish Joshi, Bellevue, WA (US); Rajeev Dwivedi, Sammamish, WA (US); Prithivi Krishna Jayapathy, Redmond, WA (US); Vikram Marthandam, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 99 days.

(21) Appl. No.: 18/669,438

(22) Filed: May 20, 2024

(51) Int. Cl.
*B65G 43/08* (2006.01)
*B65G 47/31* (2006.01)

(52) U.S. Cl.
CPC ............ *B65G 43/08* (2013.01); *B65G 47/31* (2013.01); *B65G 2203/0233* (2013.01); *B65G 2203/0291* (2013.01); *B65G 2203/041* (2013.01)

(58) Field of Classification Search
CPC .................... B65G 43/08; B65G 47/31; B65G 2203/0233; B65G 2203/0291; B65G 2203/041
USPC ...................................................... 198/460.1
See application file for complete search history.

(56) References Cited

U.S. PATENT DOCUMENTS 10,870,543 B1 12/2020 Dwivedi et al.
11,911,797 B1 * 2/2024 Dwivedi .................. B07C 5/36
2021/0292100 A1 * 9/2021 Schroader ............. B65G 43/08
2022/0152656 A1 * 5/2022 Kim ...................... B65G 43/08

OTHER PUBLICATIONS

KR102408578 (Year: 2022).*
KR20240065943 (Year: 2024).*
EP4053650 (Year: 2022).*

* cited by examiner

*Primary Examiner* — Gene O Crawford
*Assistant Examiner* — Lester Rushin, III
(74) *Attorney, Agent, or Firm* — Eversheds Sutherland (US) LLP

(57) ABSTRACT

Disclosed are various embodiments for singulation of items in a conveyor system. As items flow though conveyors and the like in a facility, such items may be directed onto a singulator that comprises a matrix of singulation conveyors. A camera is provided that has a field of view directed to the matrix of singulation conveyors. A singulation controller detects, in an image from the camera, a first one of the items and a second one of the items positioned on the matrix of singulation conveyors that require singulation in a direction of a flow of the items. The speed of at least one of the singulation conveyors is controlled to generate a relative movement between the first one of the items and the second one of the items positioned on the singulator to create a predefined gap therebetween on a downstream conveyor positioned downstream from the singulator.

19 Claims, 10 Drawing Sheets

SYSTEM AND METHOD FOR SINGULATION IN A CONVEYOR SYSTEM

BACKGROUND

With the ever-increasing popularity of e-commerce and delivery services, the volume of packages ordered and delivered to customers continues to increase. The high volume of packages requires delivery fulfillment centers and/or sorting centers capable of receiving, sorting, and distributing a very large volume of packages. For example, a fulfillment and/or sorting center may fulfill millions of orders per year. As a result, fulfillment and/or sorting centers will receive and package millions of items for delivery. To ensure each package is efficiently routed to an appropriate delivery address, packages must be sorted based on various factors including destination address. Sortation of the packages may be dependent on operational conditions in the fulfillment centers and sorting centers as well as outside factors such as environmental conditions and delivery vehicle conditions, which may quickly change.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

In a materials handling facility such as fulfillment center, it is often the case that items such as packages are crowded on conveyors as the process of receiving, sorting, transporting, and delivering is performed. Such facilities may be very large spanning over hundreds of thousands of square feet or even millions of square feet. The number of packages that move through large fulfillment centers, for example, can number in the millions or even billions each year.

At certain points in a fulfillment center or other materials handling center, it may be desirable to line up items such as packages on a conveyor or other structure in a row with a certain amount of space between packages for purposes of reading bar codes and the like to facilitate sorting or other purposes. Such a process is called singulation, which refers to lining up items such as packages in single file such that they are conveyed "one at a time."

In order to singulate items, a singulator that comprises a portion of a conveyor system is described herein. The singulator includes a matrix of singulation conveyors that are arranged in rows and columns. A singulator controller is employed to control the operation of the singulation conveyors. Items such as packages arrive onto a singulator from a feed conveyor. As items move across the singulator, images of the singulator and the items thereon are taken and items are identified and numbered in the image. Thereafter, respective pairs of items are selected based on the numbering of the items in the images. For each pair of items, the singulator controller controls respective ones of the singulation conveyors in the matrix to cause a relative movement between the items such that they are ultimately separated by a predefined gap on a downstream conveyor.

For example, the speed or velocity of some singulation conveyors of the singulator may be increased whereas the speed or velocity of other singulation conveyors may be decreased or stopped in order to move items relative to each other so that they are separated by a desired gap on a downstream conveyor.

Figure 1:
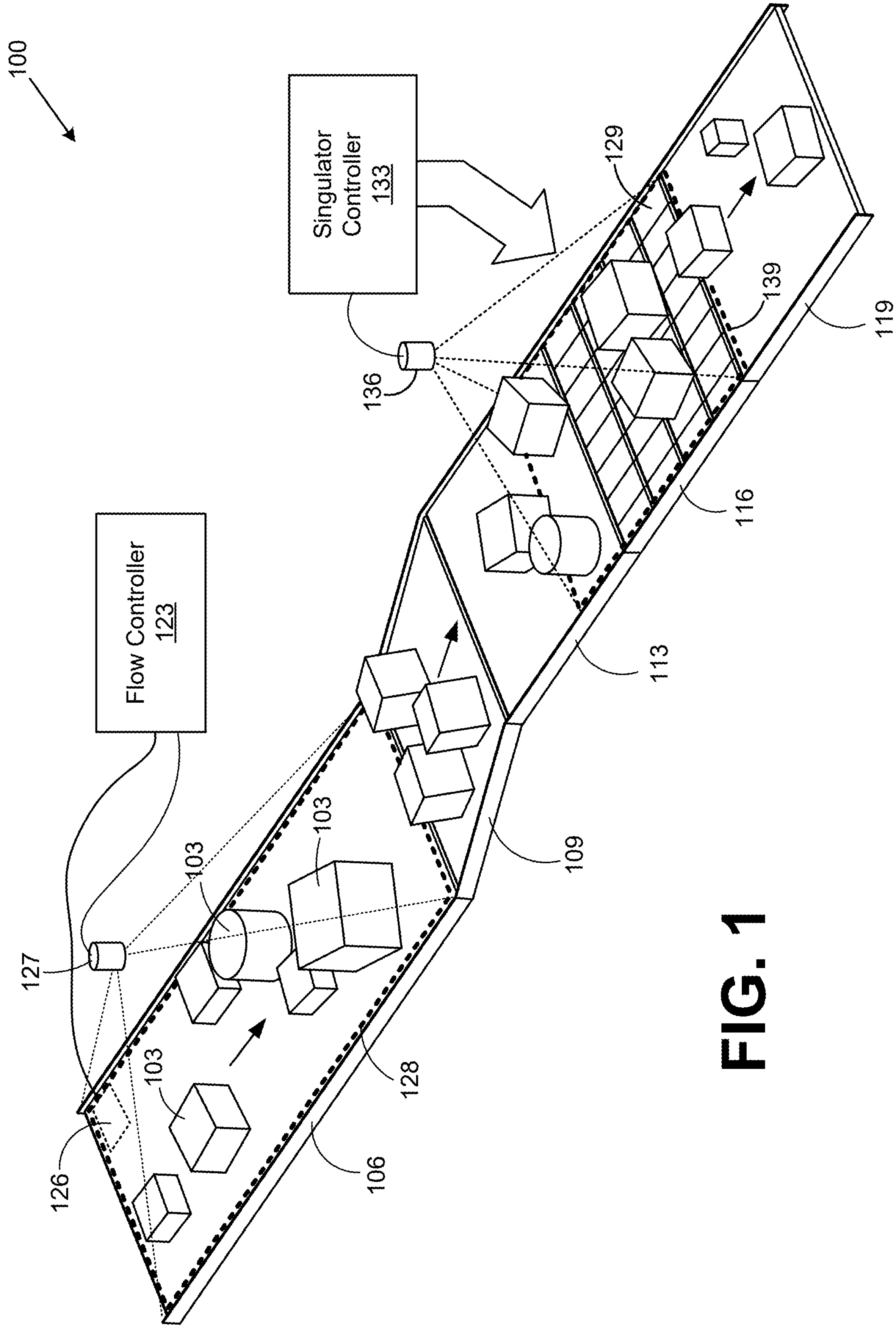
FIG. 1 is a drawing of conveyor system in accordance with the present disclosure.

In view of the foregoing, reference is made to FIG. 1 that shows an example of a conveyor system 100 according to the present disclosure. The conveyor system 100 is assembled to implement the transport of various items 103. In one example, the items 103 may comprise packages that hold various contents. The items may comprise various shapes and are of a size that falls within a predefined range for which the conveyor system 100 is designed as will be described.

The conveyor system 100 includes a flow control conveyor 106 that feeds into a spreader 109. The spreader 109 comprises a conveyor that is oriented to present an upstream incline as shown. The incline may be, for example, a rise of approximately 1.5 feet or other rise over a 4-foot distance. Alternatively, the incline may have some other rise over a given distance as is appropriate for the types of items 103 shuttled across the conveyor system 100.

The spreader 109 directs items 103 onto a feed conveyor 113. Items 103 flow along the feed conveyor 113 to a singulator 116. Items 103 are directed from the singulator 116 to a downstream conveyor 119 positioned downstream from the singulator 116. The downstream conveyor 119 directs the items 103 to other locations within a materials handling center as appropriate.

The conveyor system 100 further includes a flow controller 123 that controls the speed of the flow control conveyor 106. To this end, the flow controller 123 is electrically coupled to a motor driver/motor 126 of the flow control conveyor 106. In addition, a flow control camera 127 is positioned above the flow control conveyor 106. The flow control camera 127 generates images of the flow control conveyor 106 within the field of view 128 of the camera 127.

The flow controller 123 may comprise, for example, a processor-based system employing a processor circuit such as, for example, a programmable logic controller (PLC) or other processor-based or computing system.

The singulator 116 includes a matrix of singulation conveyors 129 that are arranged in rows and columns, where the rows are perpendicular to the direction of flow of items 103 across the singulator 116. The conveyor system 100 further includes a singulator controller 133 and a camera 136.

The singulator controller 133 is electrically coupled to a motor driver and a motor for each of the singulation conveyors 129 as will be described. The singulator controller 133 may comprise, for example, a processor-based system employing a processor circuit such as, for example, a programmable logic controller (PLC) or other processor-based or computing system.

The camera 136 is positioned so as to include the singulator 116 and a portion of the feed conveyor 113 in its field of view 139. In one example, the camera 136 generates images of the singulator 116 and a portion of the feed conveyor 113 and sends the images to the singulator controller 133 as will be described.

During operation, the conveyor system 100 provides for singulation of items 103 on the downstream conveyor 119. Specifically, the speed of the flow control conveyor 106 is adjusted to ensure that items 103 reach the spreader 109 and ultimately the singulator 116 at a desired rate to ensure the singulator 116 can effectively singulate the items 103 on the downstream conveyor 119 without being overwhelmed.

In order to determine the volumetric flow of items 103 on the flow control conveyor 106, the flow controller 123 receives images periodically from the flow control camera 127 and determines volumetric flow data therefrom as will be described. In one example, the images may be generated by the flow controller 123 every 50 milliseconds or other interval that provides enough time for the conveyor system 100 to react to a change in the flow of packages that is sensed on the flow controller 123. Based on the volumetric flow of packages sensed on the flow control conveyor 106 at any given time, the flow controller 123 generates a signal output that drives the motor driver/motor 126 to control the speed of the flow control conveyor 106. Further explanation of the flow controller 123 will be provided with reference to later figures.

In various situations, items 103 may overlap with each other or may be close to one another on the flow control conveyor 106. Such items 103 may be delayered and separated by the spreader 109 that includes an upstream incline. In one example, the spreader 109 runs at a maximum velocity for the conveyor system 100. The spreader 109 provides for rollers operating at skew angles on the incline to spread packages across the conveyor width.

Items 103 leaving the spreader 109 are then shuttled by the feed conveyor 113 toward the singulator 116. The camera 136 periodically captures images of the field of view 139 and sends the images to the singulator controller 133. In one example, the rate at which the camera 136 captures images of the field of view 139 is approximately every 50 milliseconds, although the rate of capture of the images can vary depending on the speed at which the conveyor system 100 operates.

As items 103 move from the feed conveyor 113 to the singulator 116, the respective singulation conveyors 129 operate at common speed until the speed of respective ones of the singulation conveyors 129 are adjusted in order to provide for the singulation of items 103. Each image that is captured by the camera 136 is provided to the singulator controller 133. In each image, the singulator controller 133 detects respective pairs of items 103 that are positioned on the matrix of singulation conveyors 129 that require singulation in the direction of flow of the items 103 as will be described in greater detail. Singulation may be required, for example, when a given pair of items are separated by less than a predefined gap or overlap each other along the width of the singulator 116. That is to say, in detecting that first and second ones of the items 103 require singulation, the singulator controller 133 determines whether the predefined gap exists between the respective first and second ones of the items 103.

Once it is determined that two items 103 require singulation, the singulator controller 133 controls a speed of one or more of the singulation conveyors to generate a relative movement between a first one of the items 103 and the second one of the items 103 positioned on the singulator 116 to create a predefined gap therebetween on the downstream conveyor 119. As will be described, the singulator controller 133 cycles through multiple pairs of items 103 in a given image from the camera 136 to adjust the position of the items 103 of each pair relative to each other such that the predefined gap is created between such items 103 on the downstream conveyor 119.

Figure 2:
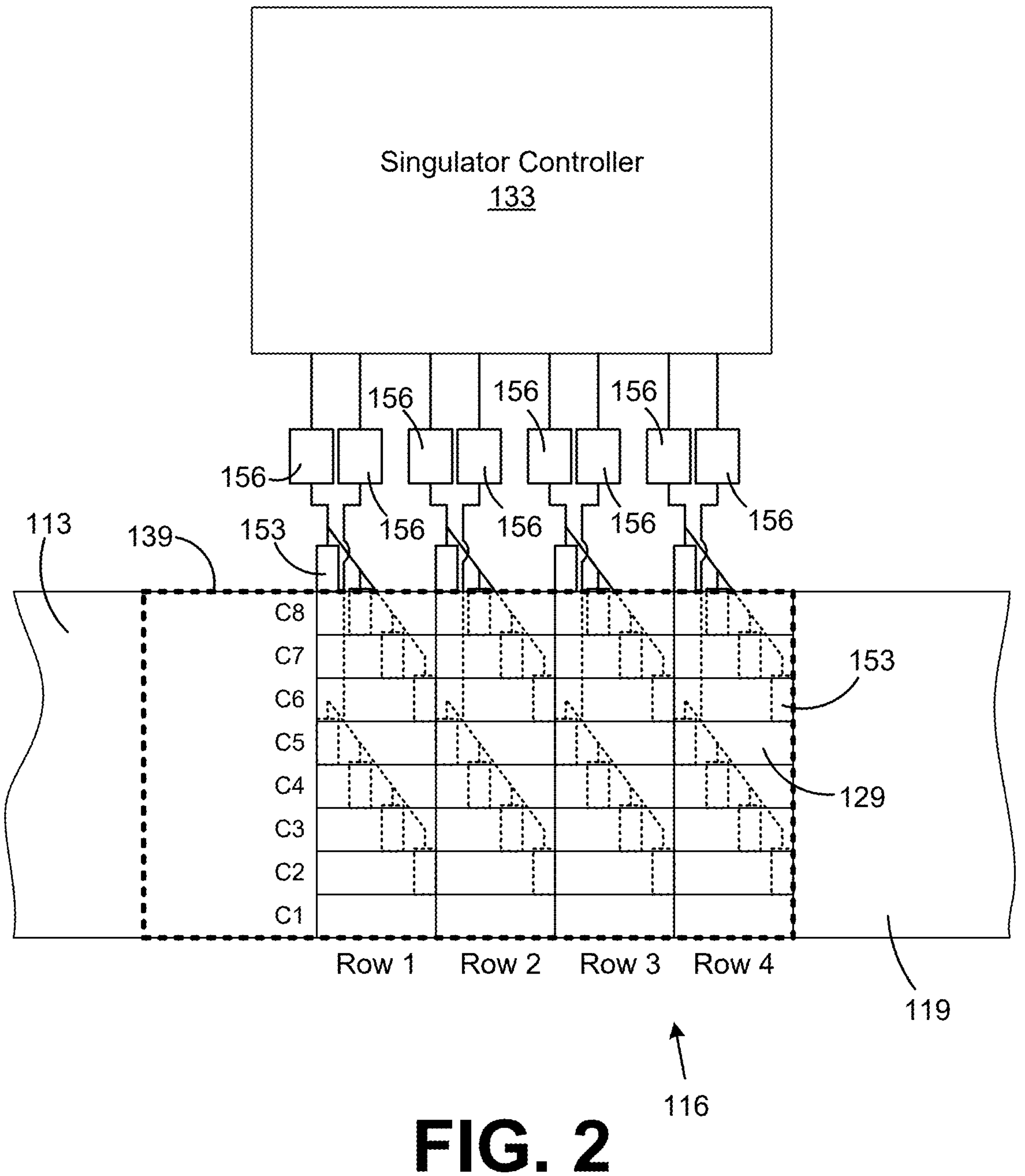
FIG. 2 is a schematic of a singulator and a singulator controller employed in the conveyor system of FIG. 1 in accordance with the present disclosure.

Referring next to FIG. 2, shown is an example view above the singulator 116. As shown, the singulator 116 includes a matrix of singulation conveyors 129 that are arranged in rows 1, 2, 3, and 4. It is understood that there may be more or less than 4 rows in a given singulator 116 where the 4 rows are shown in FIG. 2 for purposes of illustration. In addition, the singulation conveyors 129 are arranged in columns C1 through C8. There may be more or less than 8 columns in a given singulator, where 8 columns are likewise shown in FIG. 2 for purposes of illustration. In addition, the width of each of the singulation conveyors 129 may vary. In one example, the width of each of the singulation conveyors 129 is specified to accommodate the average size of the items 103 (FIG. 1) expected to be handled by the singulator 116.

Associated with each singulation conveyor 129 is an electric motor 153 that drives each respective singulation conveyor 129. As contemplated herein, the electric motors 153 may be an alternating current (AC) motor or a direct current (DC) motor. The electric motors 153 associated with the singulation conveyors 129 positioned at the edge of the singulator 116 are visible, whereas the rest of the electric motors 153 are disposed under the singulator 116 as shown.

Adjacent ones of the electric motors 153 in a respective one of the rows are offset with respect to each other in the direction of the flow of the items 103. The motors 153 have a physical footprint or length that exceeds the width of the belts of individual ones of the singulation conveyors 129. As a result, if the electric motors 153 were lined up in the same position relative to each of the singulation conveyors 129, they would physically interfere with each other. The placement of the electric motors 153 facilitates positioning the singulation conveyors 129 in rows next to each other to form the matrix of singulation conveyors 129. It may be the case that in other examples, a gap may exist between adjacent ones of the singulation conveyors 129 where items 103 are generally moved by the singulation conveyors 129 and slide over any other surface structure placed in any gap between the singulation conveyors 129.

Each of the electric motors 153 is driven by a motor driver 156 based on a signal from the singulator controller 133. In one approach, the singulator controller 133 includes a register that holds a speed value for each of the motors 153. The speed values are provided to the respective motor drivers 156 that cause the motors 153 to rotate at a corresponding speed, thereby causing a corresponding singulation conveyor 129 to move at a desired speed. In this manner, the singulator controller 133 is capable of controlling the speed of each of the singulation conveyors 129.

The motors 153 and motor drivers 156 may be powered by a common electrical power bus or they may be powered individually. In one approach, the motors 153 and motor drivers 156 may be individually coupled to an external power supply using an easy to engage-disengage system such as pogo pins or other coupling system. Alternatively, where the motors 153 and motor drivers 156 are powered off of a common bus, the bus may be coupled to an external power supply using a similar engage-disengage system such as pogo pins or another system. The use of such easy to engage-disengage systems provides for the quick removal of a given singulator 116 from a conveyor system 100 for service or repair upon an occurrence of a malfunction or other problem. In this manner, a given singulator 116 may be rapidly replaced in situations where downtime for the conveyor system 100 must be minimized.

Figure 3A:
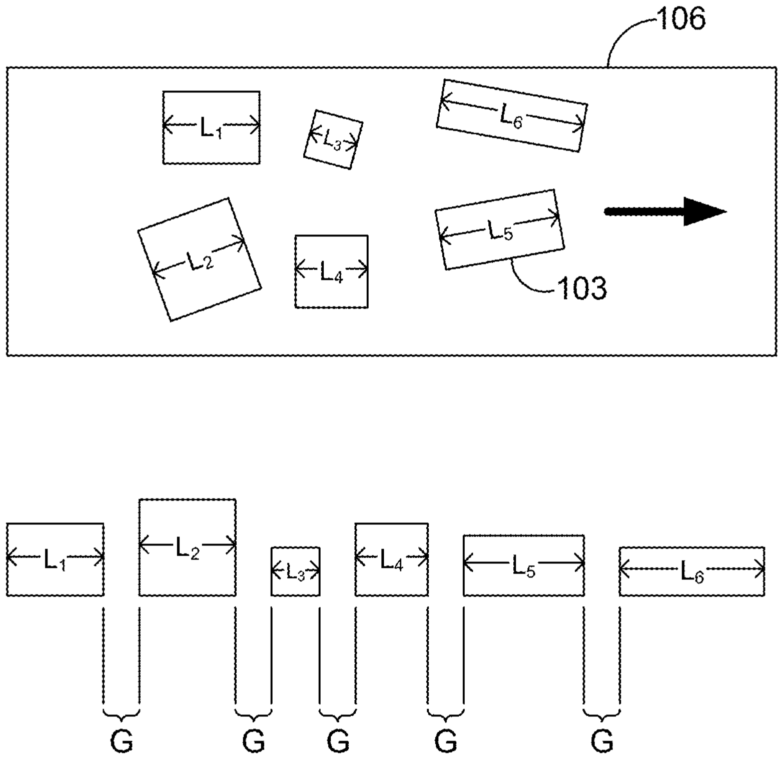
FIG. 3A is a flowchart illustrating one example of functionality implemented to control a rate of flow of a flow control conveyor in the conveyor system of FIG. 1 in accordance with the present disclosure.

Moving on to FIG. 3A, shown is a drawing that depicts an example of an image taken of the flow control conveyor 106 in the field of view 128 (FIG. 1) that is transporting a number of items 103 as captured by the flow control camera 127 (FIG. 1) according to the present disclosure. Each of the items 103 depicted on the flow control conveyor 106 has a length L generally in a direction of the flow of the flow control conveyor 106. Once an image of the flow control conveyor 106 is captured, the length L of individual ones of the items 103 depicted therein can be determined. A determination may be made as to whether rate of flow of items 103 is greater than the number of items 103 the singulator 116 can singulate in a given period of time t. This may be determined using the following equation:

$$G*n+(L_1+L_2+L_3+L_4+L_5+\ldots+L_n)\leq t\times S$$

where $L_1$ through $L_n$ are lengths of respective items 103, G is the length of a predefined gap that is desired between adjacent ones of the items after singulation, t is a predefined time period, and S is the nominal speed of the singulator 116. The nominal speed S of the singulator 116 is the speed at which the singulation conveyors 129 operate unless they are sped up or slowed down to cause a relative movement between respective items 103 as will be discussed. The time period t may be specified as the time it takes for an item 103 depicted in the image to move across the flow control conveyor 106. Alternatively, the time period t may be specified as some other length of time. In this respect, the quantity t×S is equal to a number of items 103 that can be singulated by the singulator 116 within the predefined period of time t given a desired gap G between singulated items 103.

Figure 3B:
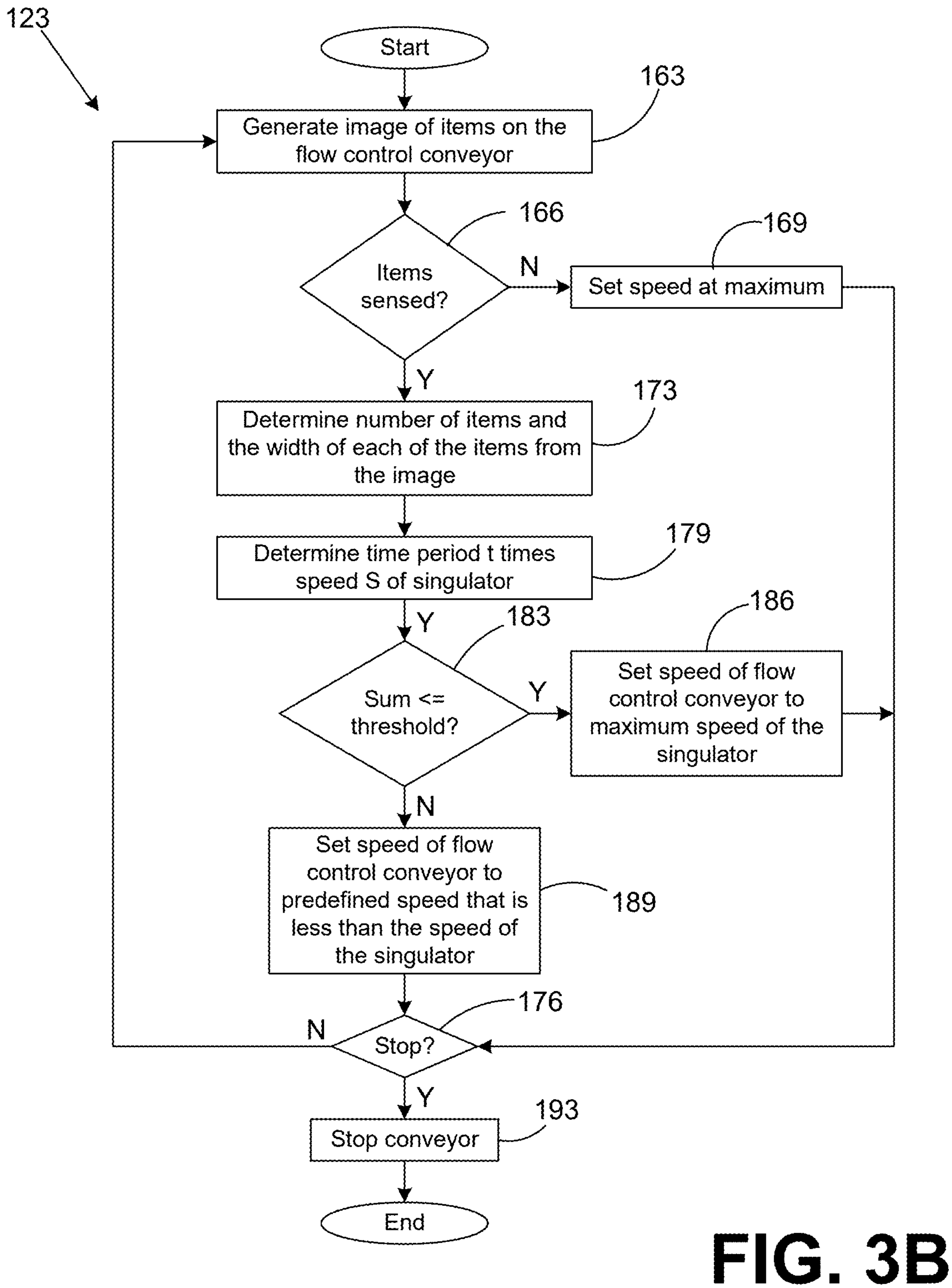
FIG. 3B is a drawing that depicts a determination of a flow rate of items on a flow control conveyor in the conveyor system of FIG. 1 in accordance with the present disclosure.

Referring next to FIG. 3B, shown is a flowchart that provides one example of the operation of a portion of the flow controller 123. It is understood that the flowchart of FIG. 3B provides merely an example of the many different types of functional arrangements that may be employed to implement the operation of the portion of the flow controller 123 as described herein. As an alternative, the flowchart of FIG. 3B may be viewed as depicting an example of elements of a method implemented by way of the flow controller 123.

The flow control conveyor 106 (FIG. 1) as controlled by the flow controller 123 provides for flow control upstream from the singulator 116 (FIG. 1) to ensure level loading of items 103 (FIG. 1) given the occurrence of instantaneous spikes above a predefined optimum threshold of conveyor throughput to prevent the singulator 116 from being overwhelmed, thereby providing for greater singulation efficiency. That is to say, the flow control conveyor 106 is positioned upstream from the singulator 116, where a speed or velocity of the flow control conveyor 106 is controlled to prevent a rate of flow of the items 103 downstream to the singulator 116 that is greater than a predefined threshold to avoid overwhelming the singulator 116 resulting in singulation failures downstream from the singulator 116.

Beginning with box 163, the flow controller 123 obtains an image from the flow control camera 127 (FIG. 1) that depicts items 103 on the flow control conveyor 106 as described above. Thereafter, in box 166, the flow controller 123 determines if items 103 appear in the image. If no items 103 are identified, the flow controller 123 proceeds to box 169. Otherwise, the flow controller 123 moves to box 173.

In box 169, the flow controller 123 sets the speed of the flow control conveyor 106 to a maximum speed or velocity allowed for the flow control conveyor 106. This allows incoming upstream items 103 to move as quickly as possible to the singulator 116. In setting the speed or velocity of the flow control conveyor 106, in one example approach the flow controller 123 writes a value representing the speed or velocity of the flow control conveyor 106 to a register reserved for the flow control conveyor 106. In the context of conveyors as described herein, the speed or velocity of a conveyor may be expressed in feet per minute (FPM) or other variable. Thereafter, the flow controller 123 moves to box 176 as shown.

Referring back to box 166, if the presence of items 103 is sensed, then the flow controller 123 proceeds to box 173. In box 173 a distance is calculated as a sum of the lengths L of the items 103 in the image plus a plurality of gaps G between adjacent ones of the items 103 using the following equation:

$$G*n+(L_1+L_2+L_3+L_4+L_5+\ldots+L_n).$$

Thereafter, in box 179, a value of t×S is calculated where t is the predefined period of time and S is the nominal speed of the singulator 116. Then, in box 183, if the sum calculated in box 173 is greater than or equal to the value of t×S, then the flow controller 123 proceeds to box 186. Otherwise, the flow controller 123 proceeds to box 189.

The value of t×S expresses a value that acts as a threshold above which the singulator 116 may begin to be overwhelmed resulting in singulation errors. In this respect, the value of t×S provides a threshold for determining whether a flow rate of items 103 will potentially overwhelm the singulator 116. The flow rate of items 103 is determined by taking into account the number of items 103, the length of the items 103, and the predefined gap G desired between the items upon singulation. If the flow rate is greater than the threshold, then the flow rate is potentially too great such that the singulator may be overwhelmed resulting in a number of singulation errors that exceeds an acceptable threshold.

For example, where the items 103 comprise packages, the equation expressed above provides for a threshold above which the singulator 116 may experience an unacceptable rate of singulation failures. In one example, a rate of singulation failures may be unacceptable if the rate of singulation failures falls below 10 percent or some other threshold percentage.

If the distance associated with the sum of the items 103 and gaps G is less than or equal to the predefined threshold, then the flow controller 123 proceeds to box 186 where the speed of the flow control conveyor 106 is set to the maximum speed to match an operating speed of the singulator 116. Thereafter, the flow controller 123 proceeds to box 176. Otherwise, the flow controller 123 proceeds to box 189.

In box 189, given that the distance associated with the sum of the items 103 and gaps G is greater than the predefined threshold, it follows that the rate of flow of the items 103 is too great to be handled by the singulator 116. In such case, the flow controller 123 sets the speed or velocity of the flow control conveyor 106 to a predefined speed that is less than the operating speed of the singulator 116. In one example approach, the predefined speed may be a set value. In other approaches, the predefined speed may be determined as a function of the rate of flow of the items 103 such that the items 103 arrive at the spreader 109 and the singulator 116 at an optimum rate for the operating velocity of the singulator 116.

Thereafter, the flow controller 123 proceeds to box 176 in which it is determined whether the flow control conveyor 106 is to be stopped. It might be the case if an event occurs such as a stop button being pressed or other event is sensed requiring a stoppage of the flow of items 103 on the conveyor system 100 (FIG. 1). If the flow control conveyor 106 is not to be stopped, the flow controller 123 loops back to box 163 to begin the process once again. Otherwise, the flow controller 123 proceeds to box 193 in which the flow control conveyor 106 is stopped. Thereafter, the functionality of the flow controller 123 ends as shown.

Figure 4:
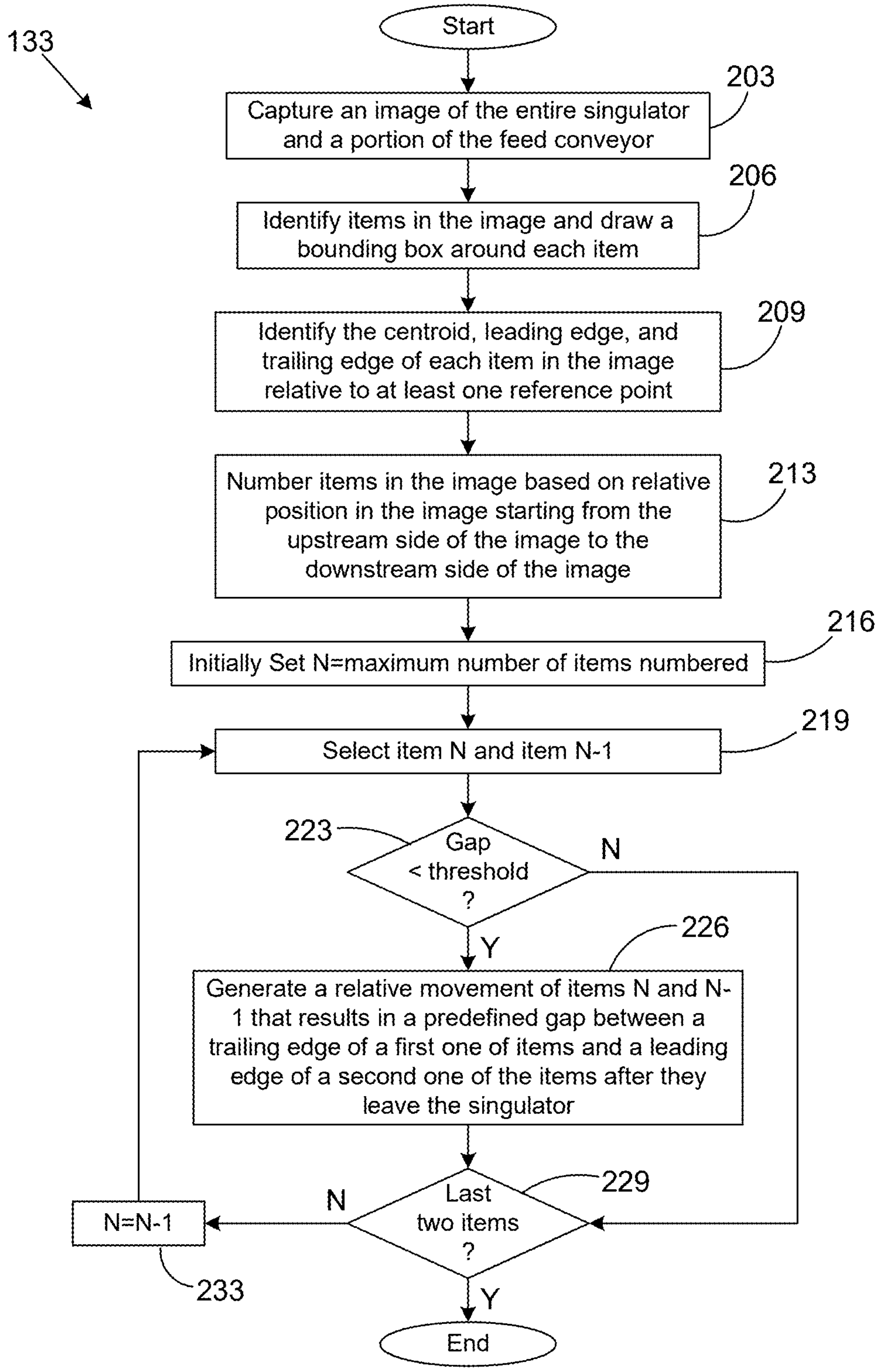
FIG. 4 is a flowchart illustrating one example of functionality implemented to control a singulator in the conveyor system of FIG. 1 in accordance with the present disclosure.

Referring next to FIG. 4, shown is a flowchart that provides one example of the operation of a portion of the singulator controller 133. It is understood that the flowchart of FIG. 4 provides merely an example of the many different types of functional arrangements that may be employed to implement the operation of the portion of the singulator controller 133 as described herein. As an alternative, the flowchart of FIG. 4 may be viewed as depicting an example of elements of a method implemented by way of the singulator controller 133.

The singulator controller 133 functions to generate a predefined gap between items 103 (FIG. 1) on the downstream conveyor 119 (FIG. 1) such that the items 103 are singulated for various purposes and processing further downstream.

Beginning with box 203, the singulator controller 133 causes the camera 136 (FIG. 1) to capture an image of the singulator 116 and a portion of the feed conveyor 113 (FIG. 1). Alternatively, the camera 136 may capture an image of the singulator 116 without the portion of the feed conveyor 113 as described above. Each time an image is captured by the camera 136, the operation of the singulator controller 133 is executed. In this manner, the images may be generated periodically such as, for example, every 50 milliseconds or other interval. The precise interval may be determined by experimentation to determine an optimal interval that provides for the greatest singulation accuracy with respect to items 103 that leave the singulator 116 while, at the same time, maximizing the throughput of items 103 on the conveyor system 100.

Thereafter, in box 206, items 103 are identified in the image by drawing a bounding box around each item 103 in the image. Next, in box 209, the singulator controller 133 identifies a centroid, leading edge, and trailing edge of each item 103 in the image relative to one or more reference points in the image. In one embodiment, such a reference point may be an edge or corner of the image. If edges of an image are taken as a reference point, then two edges would be identified as references to determine distances between leading edges, trailing edges, or centroids in both a direction of travel and a direction perpendicular to the direction of travel. Alternatively, a reference mark may be created on a stationary surface of the singulator 116 that is used as a reference point to locate a position of the leading edge, trailing edge, or centroid of a given item 103 in the image.

Thereafter, in box 213, the items 103 identified in the image are numbered based on a relative position of each item 103 in the image starting from the upstream side of the image to the downstream side of the image. For example, the item 103 that is the upstream-most item 103 in an image 103 would be numbered 1, the second upstream-most item 103 in the image would be numbered 2, the third upstream-most item 104 in the image would be numbered 3, and so on. In one approach, the items 103 that are numbered are only those items 103 that fully appear within the image as opposed to items 103 that only partially appear in the image at the upstream or downstream edges.

To identify the locations of the items 103 relative to each other for purposes of numbering, the singulator controller 133 may look at the leading edge of each item 103 and compare their leading edges with each other. Alternatively, the singulator controller 133 may look at the trailing edges or the centroids of the items 103 in determining relative placement of the items 103 in the image for purposes of numbering such items 103.

Next, in box 216, a variable N is set initially to the maximum number of items 103 numbered in the image in box 213. For example, if there are 5 items 103 that are numbered in a given image, then the variable N is initially set to 5. Then, the singulator controller 133 proceeds to box 219 in which items 103 numbered "N" and "N−1" are selected for consideration. In this respect, items 103 numbered "N" and "N−1" are a numerically consecutive pair of the items 103 that appear in the image.

Thereafter, in box 223, the singulator controller 133 detects, in the image from the camera 136, where first and second ones of the items 103 numbered N and N−1 require singulation in a direction of flow of the items 103. In this respect, the singulator controller 133 makes a determination as to whether a predefined gap exists between the item 103 numbered N and the item 103 numbered N−1. The determination may be made by examining the image to determine whether a gap that is less than a predefined gap threshold exists between items 103 numbered N and N−1. This may be done, for example, by determining whether a predefined gap exists between a trailing edge of the item 103 numbered N and the leading edge of the item 103 numbered N−1. If there is a gap of less than the predefined gap threshold, or if no gap exists such that the items 103 numbered N and N−1 overlap each other in the direction of flow, then the singulator controller 133 proceeds to box 226. Otherwise, the singulator controller 133 skips to box 229.

In box 226, the singulator controller 133 controls a speed of one or more of the singulation conveyors 129 in the matrix to generate a relative movement between items 103 numbered N and N−1 to create a predefined gap between the respective items 103 on the downstream conveyor 119. That is to say, the relative movement between items 103 numbered N and N−1 is such that the predefined gap exists between a trailing edge of a first one of the items 103 (item N) and a leading edge of a second one of the items 103 (item N−1) after they leave the singulator 116. The detailed steps as to how the singulator controller 133 orchestrates the relative movement between the items 103 numbered N and N−1 is described with reference to later figures.

Next, in box 229, the singulator controller 133 determines whether the last two consecutively numbered items 103 have been considered in boxes 223 and 226. If so, then the singulator controller 133 ends as shown. In this respect, the operation of the singulator controller 133 set forth in FIG. 4 is executed for each image that is generated by the camera 136.

If the last two consecutively numbered items 103 have not yet been considered as such, the singulator controller 133 moves to box 233 where the variable N is decremented by 1. Thereafter, the singulator controller 133 loops back to box 219 to consider the next pair of items 103 numbered N and N−1.

In this manner, the functions set forth in boxes 223 and 226 are performed for a plurality of numerically consecutive pairs of items 103 starting with a pair of items 103 that includes a highest numbered one of the items 103 to a pair that includes a lowest numbered one of the items. This facilitates adjustment of the relative positioning of the items 103 on the singulator 116 with respect to each other so that ultimately a predefined gap exists between the singulated items 103 as they proceed onto the downstream conveyor 119. In one example, the gap between adjacent ones of the items 103 on the downstream conveyor 119 may be measured in terms of inches such as 3, 4, 5, or 6 inches, or some other value. The ultimate size of the gap between adjacent ones of the items 103 on the downstream conveyor 119 may depend upon the processing that is to occur to the items 103 downstream from the conveyor system 100.

Figure 5:
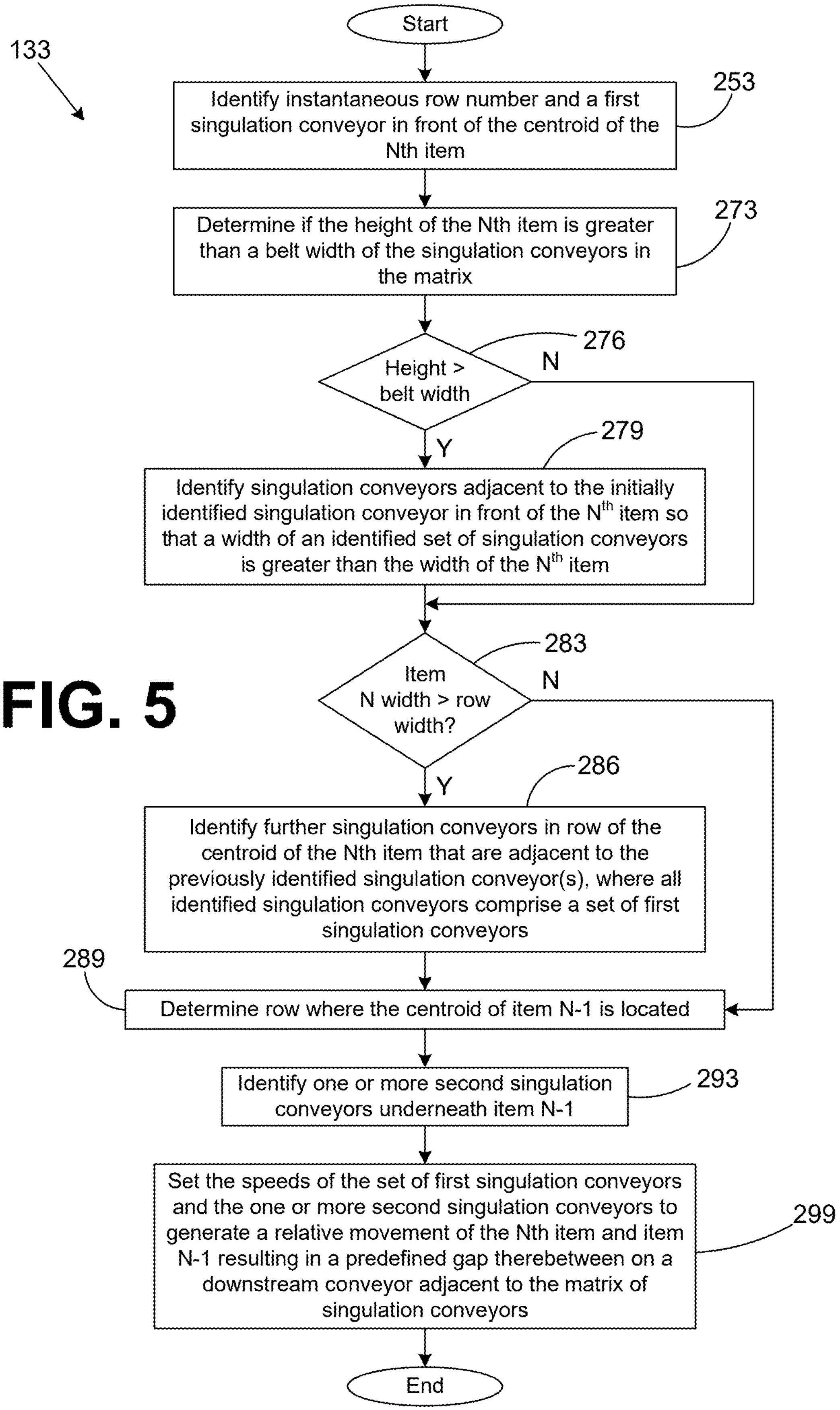
FIG. 5 is a flowchart that further illustrates an example of functionality implemented to control the singulator in the conveyor system of FIG. 1 in accordance with the present disclosure.

With reference to FIG. 5, shown is a flowchart that provides an example of further operation of a portion of the singulator controller 133. It is understood that the flowchart of FIG. 5 provides merely an example of the many different types of functional arrangements that may be employed to implement the further operation of the portion of the singulator controller 133 as described herein. As an alternative, the flowchart of FIG. 5 may be viewed as depicting an example of further elements of a method implemented by way of the singulator controller 133.

FIG. 5 depicts the functionality or steps implemented to provide for the relative movement between items 103 in box 226 (FIG. 4) as described above.

To begin, in box 253 the instantaneous row number in front of, or downstream to, the item N is identified. Also, a specific one of the singulation conveyors 129 that is positioned in front of, or downstream to, the centroid of the item N is identified.

Figure 6A:
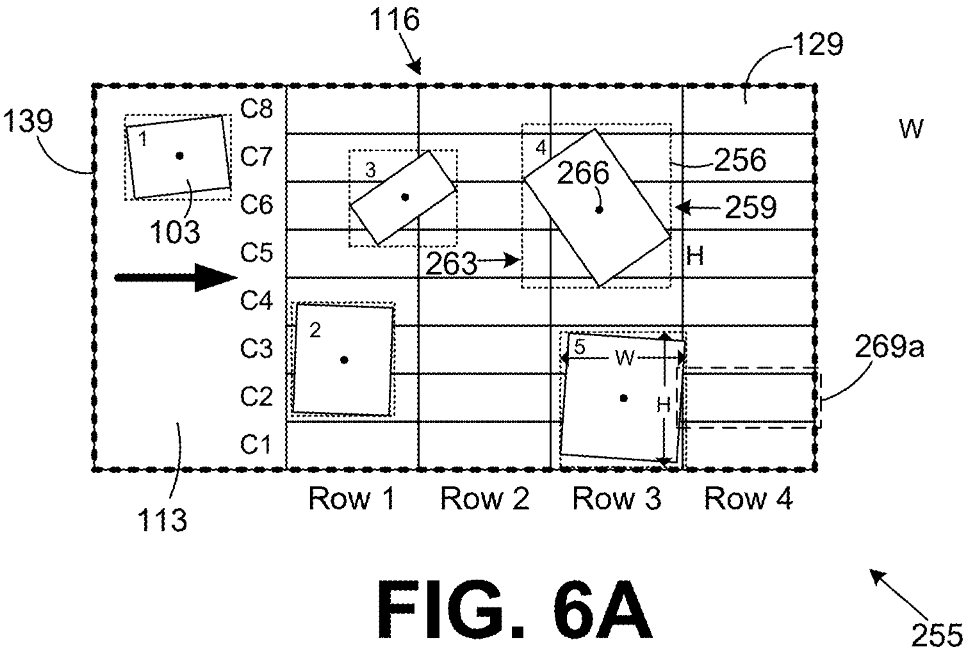
FIGS. 6A through 6D illustrate images of items on the singulator that facilitate control of the singulator in the conveyor system of FIG. 1 in accordance with the present disclosure.

To further illustrate, reference is made to FIG. 6A that shows an example of an image 255 that depicts the portion of the feed conveyor 113 and the singulator 116 that appear in the field of view 139 of the camera 136 (FIG. 1). The singulator 116 includes the matrix of singulation conveyors 129. The image 255 depicts a number of items 103 disposed on the portion of the feed conveyor 113 and the singulator 116. The items 103 are numbered from 1 to 5 starting from the upstream side to the downstream side of the image 255. A bounding box 256 is formed around each of the items 103, where each bounding box 256 includes a leading edge 259 and a trailing edge 263. In one example, the sides of the bounding boxes 256 formed around items 103 are parallel to the sides of the image 255. Also, a centroid 266 is identified for each item 103. Each centroid 266 represents a center of the image of a respective item 103. Also, individual ones of the bounding boxes 256 have a height H and a width W as shown with respect to item 103 number 5.

As mentioned with respect to box 253 (FIG. 5), an instantaneous row number in front of item N is identified. Assuming N=5, in the example image 255 Row 4 would then be identified. Thereafter, a selected conveyor 269*a* from the singulation conveyors 129 is identified in the row that is in front of the centroid 266 of item N. As shown, the selected conveyor 269*a* is in Row 4, Column C2. To identify specific singulation conveyors 129 in the image, areas of pixels of images generated by the camera 136 may be associated with corresponding ones of the singulation conveyors 129 given that the camera 136 is held in a fixed location. In this respect, the areas of pixels of the image may be specified relative to a common point on the image. In one example, such a common point may be a mark that exists on a stationary point on the singulator 116.

Referring back to FIG. 5, next in box 273 it is determined whether a height of the item N is greater than the belt width of the singulation conveyors 129 in the matrix. If so, then more than one adjacent singulation conveyor 129 may need to operate in concert to move or stop the progress of the $N^{th}$ item 103. The height of a given item 103 in the image 255 involves the length of the leading or trailing edges 259 or 263 given that the leading and trailing edges 259 or 263 of the bounding boxes 256 are parallel to the sides of the image 255.

Next in box 276, if the height of the $N^{th}$ item 103 is greater than the width of the singulation conveyors 129, then the singulator controller 133 proceeds to box 279. Otherwise, the flow proceeds to box 283.

Figure 6B:
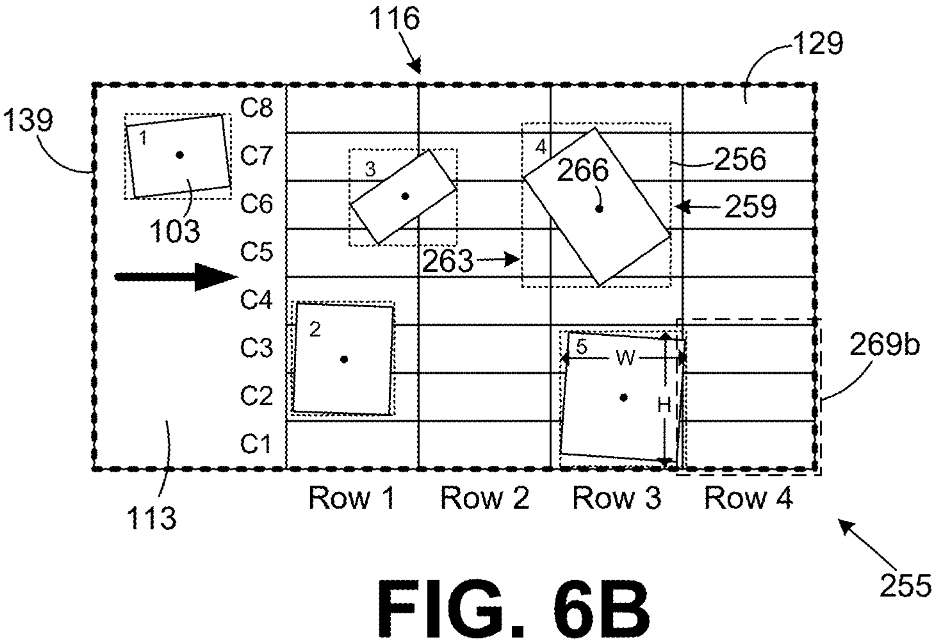

In box 279, the singulator controller 133 identifies singulation conveyors 129 that are adjacent to the initially identified singulation conveyor 129, where a width of an identified set of the singulation controllers 133 is greater than the width of the $N^{th}$ item 103. With reference to FIG. 6B, shown is the image 255 that depicts a set of selected conveyors 269*b*, where singulation conveyors 129 on either side of the initially selected singulation conveyor 129 are included in the set. In creating the relative movement between items 103 number N and N−1, all of the selected conveyors 269*b* are controlled to operate together as a single conveyor to cause a desired movement of the respective item 103.

Referring back to FIG. 5, the flow proceeds to box 283 in which it is determined whether a width of the Nth item 103 is greater than the width of the rows of the matrix of singulation conveyors 129. If so, then the singulator controller 133 proceeds to box 286. Otherwise, the singulator controller skips to box 289.

In box 286, the singulator controller 133 selects additional singulation conveyors 129 to accommodate the width of the $N^{th}$ package 103. In this respect, the singulation controller 133 identifies singulation conveyors 129 in a row in which the centroid 266 (FIG. 6A) of the Nth item 103 falls and that are adjacent to the previously identified singulation conveyors 129, where all identified or selected singulation conveyors 129 comprise a set of first singulation conveyors 129 that operate together in concert as a single conveyor to move or stop the movement of the $N^{th}$ item 103. In this respect, the first singulation conveyors 129 may be caused to operate at the same speed to move the $N^{th}$ item 103.

Figure 6C:
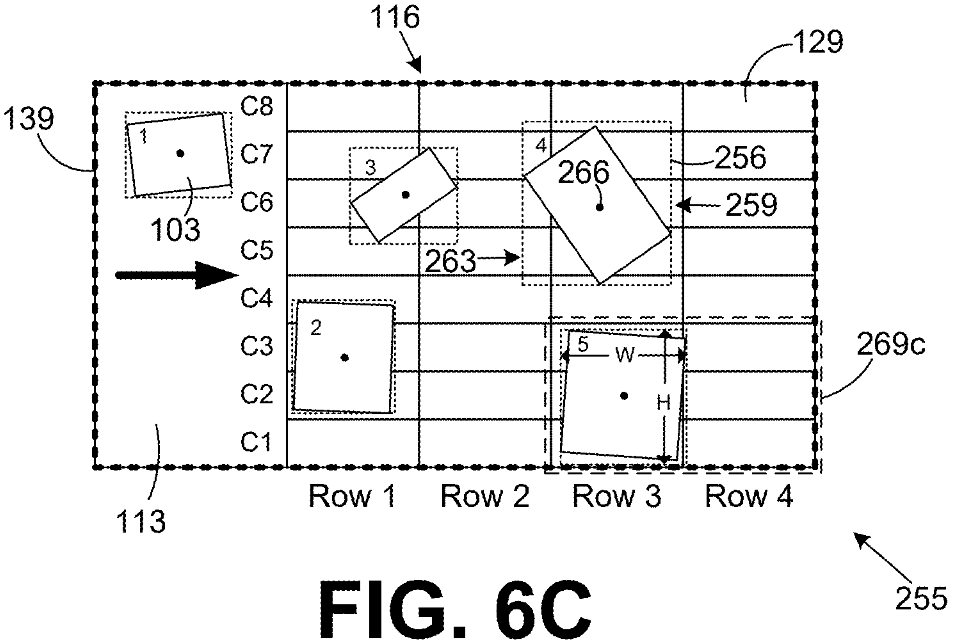

Referring to FIG. 6C, the selected conveyors 269*c* from among the singulation conveyors 129 include singulation conveyors 129 from two rows that can be controlled to operate together as a single conveyor to cause a desired movement of the $N^{th}$ item 103.

With reference back to FIG. 5, once additional singulation conveyors 129 are identified to accommodate the width of the Nth item 103 in box 286, the flow proceeds to box 289 to determine a row in which the centroid 266 (FIG. 6A) of the item 103 numbered N−1 is located. Thereafter, in box 293, one or more of the singulation conveyors 129 are identified that are located underneath the item 103 numbered N−1.

Figure 6D:
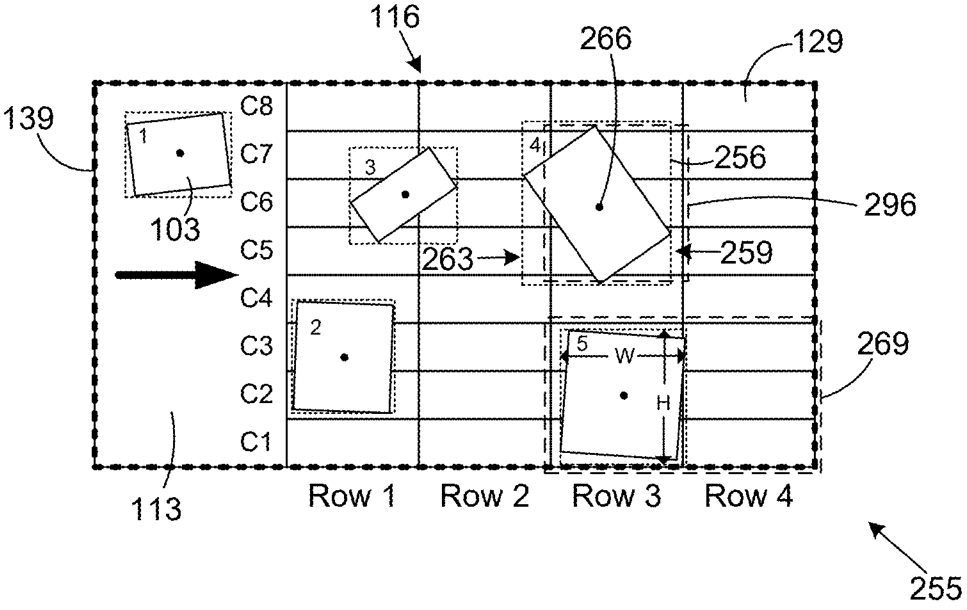

For example, with reference to FIG. 6D, shown are selected conveyors 296 from among the singulation conveyors 129 that are positioned under the item 103 numbered N−1, where N=5 in the example of FIG. 6D. In one approach, first a given one of the singulation conveyors 129 where the centroid 266 of the item 103 numbered N−1 is located and is identified as a first one of the selected conveyors 296. Then, adjacent ones of the singulation conveyors 129 may be selected such that the selected conveyors 296 cover or nearly cover the entire footprint of the item 103. The selected conveyors 296 are deemed to be a set of second singulation conveyors 129 that are controlled together as if they were a single conveyor to move the respective item 103 numbered N−1 as will be described below.

Referring back to FIG. 5, in box 299, the singulator controller 133 sets the speeds of the set of one or more first singulation conveyors 129 and the set of one or more second singulation conveyors 129 to generate a relative movement of the item 103 numbered N and item 103 numbered N−1 that results in a predefined gap therebetween on the downstream conveyor 119 that is adjacent to the singulator 116 and its matrix of singulation conveyors 129. Thereafter, this portion of the singulator controller 133 ends as shown.

Figure 7:
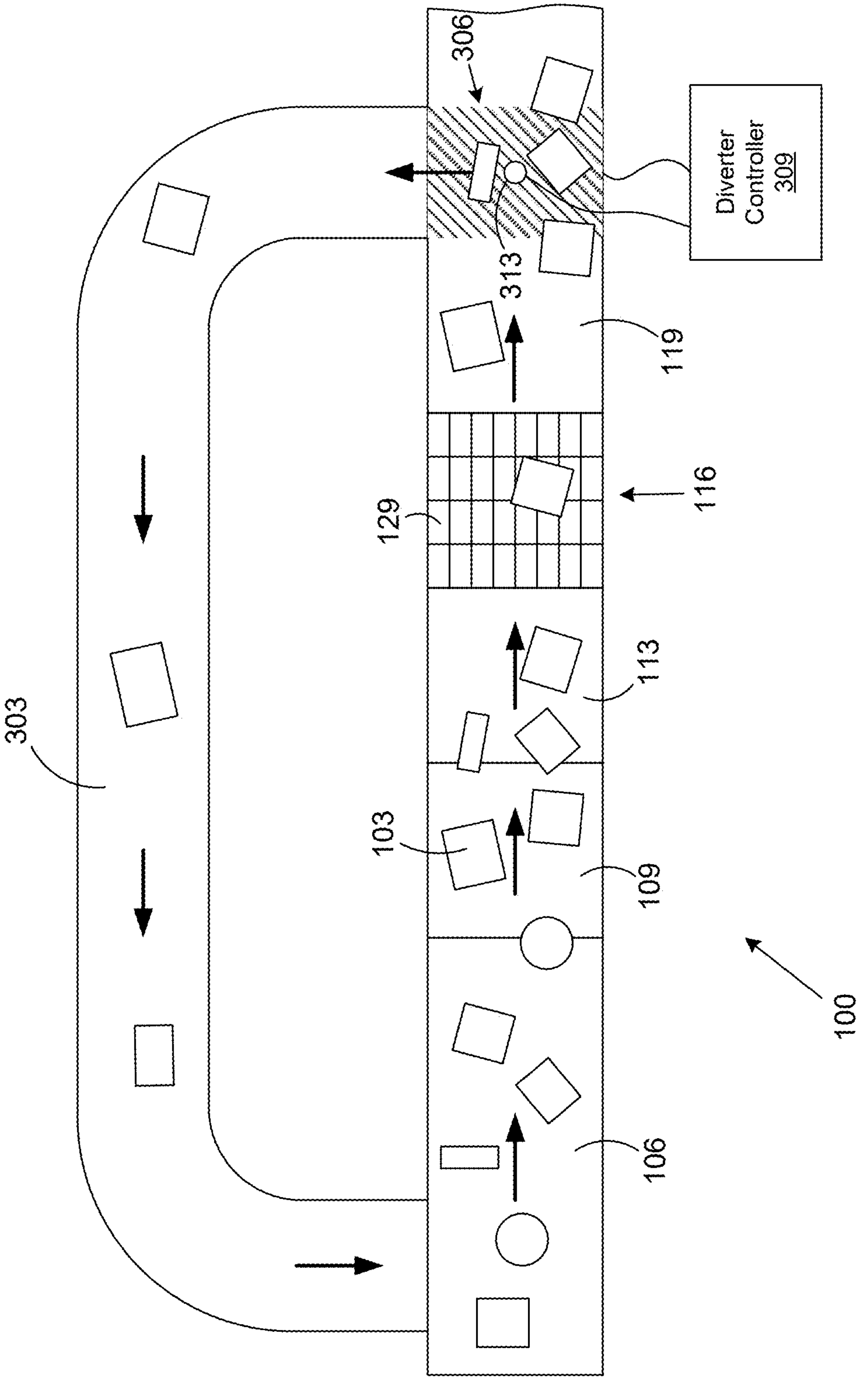
FIG. 7 depicts the conveyor system of FIG. 1 that diverts items from downstream of the singulator to recirculate the items upstream from the singulator in the conveyor system of FIG. 1 in accordance with the present disclosure.

With reference to FIG. 7, shown is an example of the conveyor system 100 that further includes a recirculation conveyor 303. The recirculation conveyor 303 is operatively coupled to the downstream conveyor 119 to receive items 103 that are diverted from the downstream conveyor 119 due to a singulation failure. A diverter 306 is associated with the downstream conveyor 119 that serves to divert items 103 from the downstream conveyor 119 to the recirculation conveyor 303.

The diverter 306 may comprise, for example, rollers or other mechanical structures that cause an item 103 to move off of the downstream conveyor 119 to the recirculation conveyor 313.

Various approaches may be employed to detect a singulation failure on the downstream conveyor 119. In one example, a camera 313 may be positioned relative to the downstream conveyor 119 to take images of a portion of the downstream conveyor 119. The images may be analyzed by the diverter controller 309 to identify a singulation failure with respect to two or more items 103 on the downstream conveyor 119.

A singulation failure may comprise, for example, when two items 103 on the downstream conveyor 119 are separated by less than the desired predefined gap including items 103 that overlap either partly or wholly in a direction perpendicular to the direction of travel of the conveyor system 100.

From time to time, the singulator 116 may not successfully singulate every item 103 with respect to each other on the downstream conveyor 119. For example, the success rate may be approximately 90 percent or other threshold. When the diverter controller 309 detects a singulation failure, one or more items 103 are diverted from the downstream conveyor 119 to the recirculation conveyor 303. The recirculation conveyor 303 routes diverted items 103 back to a point that is upstream from the singulator 116 where the items 103 are placed back into the flow of items 103 on the conveyor system 100. In this respect, a diversion system operates to recirculate items 103 from a point downstream from the singulator 116 to a point upstream from the singulator 116 in response to a singulation failure.

Figure 8:
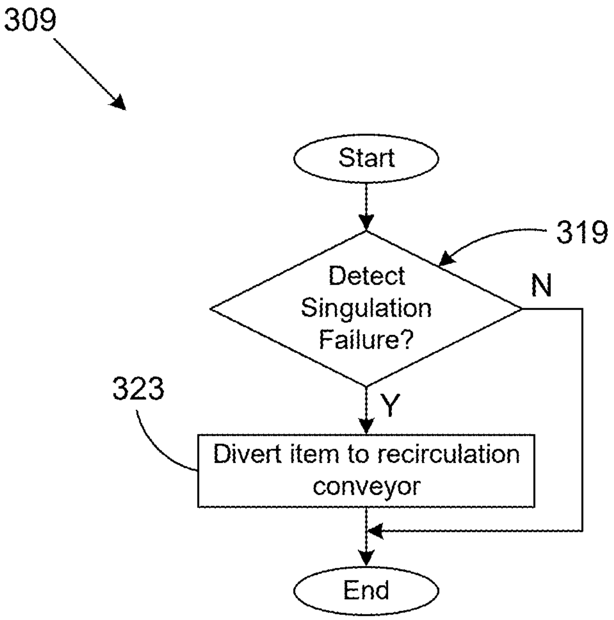
FIG. 8 is a flowchart illustrating one example of functionality implemented to control a diverter in the conveyor system of FIG. 7 in accordance with the present disclosure.

With reference to FIG. 8, shown is a flowchart that provides an example of further operation of a portion of the diverter controller 309. It is understood that the flowchart of FIG. 8 provides merely an example of the many different types of functional arrangements that may be employed to implement the operation of the diverter controller 309 as described herein. As an alternative, the flowchart of FIG. 8 may be viewed as depicting an example of further elements of a method implemented by way of the singulator controller 133 (FIG. 1).

The diverter controller 309 functionality described with respect to FIG. 8 is implemented for each image generated by the camera 313. In one example, the camera 313 repeatedly captures images of a portion of the downstream conveyor 119 at the site of the diverter 306. The frequency at which the images are generated by the camera 313 is specified so that it is unlikely that a singulation failure that has occurred will pass the camera 313 without detection.

Beginning with box 319, the diverter controller 309 analyzes an image captured by the camera 313 to determine whether a singulation failure has occurred. A singulation failure may comprise, for example, when two or more items 103 are on the downstream conveyor 119 and are not separated by the predefined gap as described above. Such items 103 may partly or wholly overlap along an axis perpendicular to the flow of items 103 down the downstream conveyor 119. Assuming that a singulation failure is detected in box 319, then in box 323 at least one item 103 is diverted from the downstream conveyor 119 to the recirculation conveyor 303 to be routed back to a point in the conveyor system 100 (FIG. 1) upstream from the singulator 116 as described above. In one approach, all items 103 that are positioned within the field of view of the camera 313 may be diverted to the recirculation conveyor 303. Thereafter, the diverter controller 309 ends as shown.

Assuming that the items 103 in the image are separated by the predefined gap, then the diverter controller 309 ends as shown.

Figure 9:
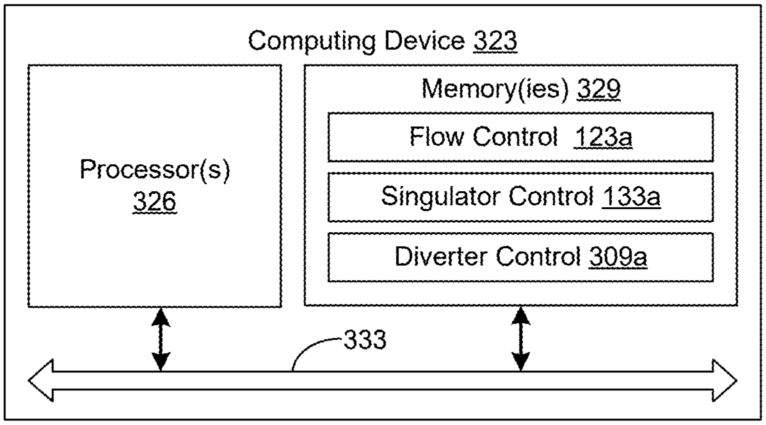
FIG. 9 is a schematic diagram of a computing device that may be employed to implement the various applications employed in the conveyor systems of FIG. 1 and FIG. 7 in accordance with the present disclosure.

With reference to FIG. 9, shown is an example of schematic block diagram of the computing device 323 that may be employed as the flow controller 123, the singulator controller 133, or the diverter controller 309 according to an embodiment of the present disclosure. Such a computing device 323 may comprise, for example, a programmable logic controller (PLC) or other computing system. Alternatively, a server-based system may be employed. Each computing device 323 includes at least one processor circuit, for example, having a processor 326 and a memory 329, both of which are coupled to a local interface 333. To this end, each computing device 323 may comprise, for example, at least one server computer or like device. The local interface 333 may comprise, for example, a data bus with an accompanying address/control bus or other bus structure as can be appreciated.

Stored in the memory 329 are both data and applications that are executable by the processor 326. In particular, stored in the memory 329 and executable by the processor 326 are executable applications such as a flow control 123*a*, singulator control 133*a*, the diverter control 309*a*, and/or potentially other applications. The flow control 12*a*, singulator control 133*a*, and the diverter control 309*a* are applications that are executed to implement the functionality performed by the flow controller 123, singulator controller 133, and the diverter controller 309, respectively. In this respect, the various physical components such as motor drivers and other physical components that are controlled by the above applications may be coupled to the processor circuit by appropriate wired or wireless interfaces. In addition, an operating system may be stored in the memory 329 and executable by the processor 326.

The memory 329 is defined herein as including both volatile and nonvolatile memory and data storage components. Volatile components are those that do not retain data values upon loss of power. Nonvolatile components are those that retain data upon a loss of power. Thus, the memory 329 may comprise, for example, random access memory (RAM), read-only memory (ROM), hard disk drives, solid-state drives, memory cards accessed via a memory card reader, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, any logic or application described herein, including list of main applications, that comprises software or code can be embodied in any non-transitory computer-readable medium for use by or in connection with an instruction execution system such as, for example, the processor 326 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. For example, a computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying instructions executable in at least one computing device, the instructions causing the at least one computing device to:

identify, in an image from a camera directed toward a singulator comprising a matrix of singulation conveyors, a plurality of items on the matrix of singulation conveyors that require singulation in a direction of a flow of items;

creating a bounding box around individual ones of the items identified in the image;

assigning numbers to the items in an order starting from an upstream side to a downstream side of the image;

determining whether singulation is required for a plurality of numerically consecutive pairs of the items starting from the highest and second highest ones of the numbers assigned to the items and proceeding to the lowest and second lowest ones of the numbers assigned to the items;

for at least one of the consecutive pairs, generating a relative movement between the items in the at least one of the consecutive pairs to create a predefined gap between the items in the at least one of the consecutive pairs by:

increasing a speed at which a first one of the items is moved across the singulator by increasing a speed of at least one first one of the singulation conveyors; and decreasing a speed at which a second one of the items is moved across the singulator or stopping a movement of the second one of the items by decreasing a speed of or stopping at least one second one of the singulation conveyors.

2. The non-transitory computer-readable medium embodying instructions executable in at least one computing device of claim 1, wherein the singulator and a portion of a feed conveyor are depicted in the image.

3. The non-transitory computer-readable medium embodying instructions executable in at least one computing device of claim 1, wherein the determining whether singulation is required for the plurality of numerically consecutive pairs of the items further comprises determining whether at least the predefined gap exists between the items of a respective one of the numerically consecutive pairs of items.

4. An apparatus, comprising:

a singulator having a matrix of singulation conveyors that move a plurality of items;

a camera having a field of view directed to the matrix of singulation conveyors; and at least one processor circuit with a memory comprising instructions that, when executed by the processor circuit, cause the at least one processor circuit to at least:

detect, in an image from the camera, a first one of the items and a second one of the items positioned on the matrix of singulation conveyors that require singulation in a direction of a flow of the items; and control a speed of at least one of the singulation conveyors to generate a relative movement between the first one of the items and the second one of the items positioned on the singulator to create a predefined gap between the first and second ones of the items on a downstream conveyor positioned downstream from the singulator.

5. The apparatus of claim 4, wherein the field of view of the camera further comprises a portion of a feed conveyor positioned upstream from the singulator.

6. The apparatus of claim 4, wherein:

the singulation conveyors in the matrix are arranged in a plurality of rows;

individual ones of the singulation conveyors are driven by corresponding ones of a plurality of motors; and adjacent ones of the motors in a respective one of the rows are offset with respect to each other in the direction of the flow of the items.

7. The apparatus of claim 4, wherein the at least one of the singulation conveyors are positioned downstream from the first one of the items.

8. The apparatus of claim 4, wherein the at least one of the singulation conveyors are positioned under the first one of the items.

9. The apparatus of claim 4, wherein the at least one of the singulation conveyors are positioned under the second one of the items.

10. The apparatus of claim 4, wherein the detecting, in the image from the camera, the first one of the items and the second one of the items positioned on the matrix of singulation conveyors that require singulation in the direction of the flow of the items further comprises determining whether the predefined gap exists between the first and second ones of the items.

11. The apparatus of claim 4, further comprising a flow control conveyor positioned upstream from the singulator, wherein a speed of the flow control conveyor is controlled to prevent a rate of flow of the items downstream to the singulator that is greater than a predefined threshold.

12. A method, comprising:

moving a plurality of packages using a feed conveyor toward a singulator, the singulator comprising a matrix of singulation conveyors;

selecting a first one of the packages and a second one of the packages as a numerically consecutive pair based on numbers assigned to the first one of the packages and the second one of the packages;

determining whether a predefined gap exists between the first one of the packages and the second one of the packages when the first and second ones of the packages are positioned on the singulator;

identifying at least one of the singulation conveyors that is associated with a movement of the first one of the packages; and controlling a speed of the at least one of the singulation conveyors in the matrix to generate a relative movement between the first and second ones of the packages to create the predefined gap between the first and second ones of the packages on a downstream conveyor.

13. The method of claim 12, wherein the at least one of the singulation conveyors further comprises a first at least one of the singulation conveyors, the method further comprising:

identifying a second at least one of the singulation conveyors that is associated with a movement of the second one of the packages; and wherein a speed of the second at least one of the singulation conveyors in the matrix is controlled to generate the relative movement between the first and second ones of the packages to create the predefined gap between the first and second ones of the packages on the downstream conveyor.

14. The method of claim 13, wherein the determining whether the predefined gap exists, the identifying of the first at least one of the singulation conveyors, the identifying of the second at least one of the singulation conveyors, and the controlling of the speed of the first at least one of the singulation conveyors and the second at least one of the singulation conveyors in the matrix is performed for a plurality of numerically consecutive pairs of the packages starting with a pair that includes a highest numbered one of the packages to a pair that includes a lowest numbered one of the packages.

15. The method of claim 12, wherein the selecting is based on an image of at least the singulator captured by a camera, and wherein the first one of the packages and the second one of the packages are identified in the image.

16. The method of claim 12, further comprising arranging the matrix of singulation conveyors into a plurality of rows and columns.

17. The method of claim 12, wherein the first at least one of the singulation conveyors further comprises one of the singulation conveyors that is under the first one of the packages.

18. The method of claim 12, wherein the first at least one of the singulation conveyors further comprises one of the singulation conveyors that is in front of the first one of the packages.

19. The method of claim 12, wherein the downstream conveyor is positioned downstream from the singulator, the method further comprising:

identifying at least two of the packages on the downstream conveyor separated by less than at least the predefined gap; and recirculating one of the at least two of the packages from the downstream conveyor to a position on a conveyor system that is upstream relative to the singulator.

* * * * *